US012747762B2

(12) United States Patent
Nishikawa

(10) Patent No.: US 12,747,762 B2
(45) Date of Patent: Sep. 29, 2026

(54) TORQUE LIMITER

(71) Applicant: EXEDY Corporation, Neyagawa (JP)

(72) Inventor: Kiyonari Nishikawa, Osaka (JP)

(73) Assignee: EXEDY CORPORATION, Neyagawa (JP)

( * ) Notice: Subject to any disclaimer, the term of this patent is extended or adjusted under 35 U.S.C. 154(b) by 235 days.

(21) Appl. No.: 18/764,281

(22) Filed: Jul. 4, 2024

(65) Prior Publication Data

US 2025/0043831 A1 Feb. 6, 2025

(30) Foreign Application Priority Data

Aug. 2, 2023 (JP) ................................ 2023-126060

(51) Int. Cl.
*F16D 7/02* (2006.01)

(52) U.S. Cl.
CPC .................................... *F16D 7/025* (2013.01)

(58) Field of Classification Search
CPC .......... F16D 7/024; F16D 7/025; F16D 7/027; F16D 43/213; F16D 43/215; F16D 43/216; F16F 15/1297; F16F 15/1397
USPC .................... 464/45, 46, 47, 48, 68.4, 68.41
See application file for complete search history.

(56) References Cited

U.S. PATENT DOCUMENTS 4,373,358 A * 2/1983 Pearch .................... F16D 7/025 464/48
4,464,137 A * 8/1984 Jennings ................. F16D 7/025 464/48
4,715,485 A * 12/1987 Rostin ................. F16F 15/1292 464/68.41
5,904,234 A * 5/1999 Kosumi .................. F16D 13/52 192/109 A
6,231,448 B1 * 5/2001 Abe ........................ F16D 7/025 464/46
8,210,950 B2 * 7/2012 Nakagaito ........... F16F 15/1397 464/46
9,243,670 B2 * 1/2016 Nakagaito ........... F16F 15/1397
11,441,639 B2 * 9/2022 Mepham ................ F16D 7/027
(Continued)

FOREIGN PATENT DOCUMENTS

DE 1194654 B * 6/1965 ............. F16D 7/025
DE 3145116 A1 * 5/1983 ............. F16D 7/025
(Continued)

*Primary Examiner* — Josh Skroupa
(74) *Attorney, Agent, or Firm* — United IP Counselors, LLC

(57) ABSTRACT

A torque limiter includes a first cover plate, a second cover plate, a transmission member, a pressure plate, a plurality of disc springs, and a friction-generating unit. The second cover plate is disposed away from the first cover plate in an axial direction. The transmission member is disposed between the first cover plate and the second cover plate. The pressure plate is disposed between the second cover plate and the transmission member. Each of the disc springs is disposed between the pressure plate and the second cover plate. The disc springs each urge the pressure plate toward the transmission member. The disc springs are stacked in parallel. The friction-generating unit is disposed between the first cover plate and the transmission member and/or between the pressure plate and the transmission member.

9 Claims, 1 Drawing Sheet

(56) References Cited

U.S. PATENT DOCUMENTS

| | | | | |
|---|---|---|---|---|
| 2012/0031726 | A1* | 2/2012 | Grubb | F16D 7/025 192/66.31 |
| 2012/0115620 | A1* | 5/2012 | Iwama | F16D 7/027 464/46 |
| 2021/0355999 | A1* | 11/2021 | Janz | F16D 7/025 |

FOREIGN PATENT DOCUMENTS

| | | | | | |
|---|---|---|---|---|---|
| DE | 10315808 | A1 | * | 10/2004 | F16D 7/025 |
| DE | 102018131309 | A1 | * | 6/2020 | F16D 7/027 |
| DE | 102020123462 | A1 | * | 3/2022 | F16D 7/027 |
| DE | 102020123463 | A1 | * | 3/2022 | F16D 7/027 |
| EP | 0523972 | A2 | * | 1/1993 | F16D 7/025 |
| GB | 774720 | A | * | 5/1957 | F16D 7/025 |
| GB | 2220046 | A | * | 12/1989 | F16D 7/025 |
| GB | 2347719 | A | * | 9/2000 | F16D 7/027 |
| JP | 2023011159 | A | | 1/2023 | |

* cited by examiner

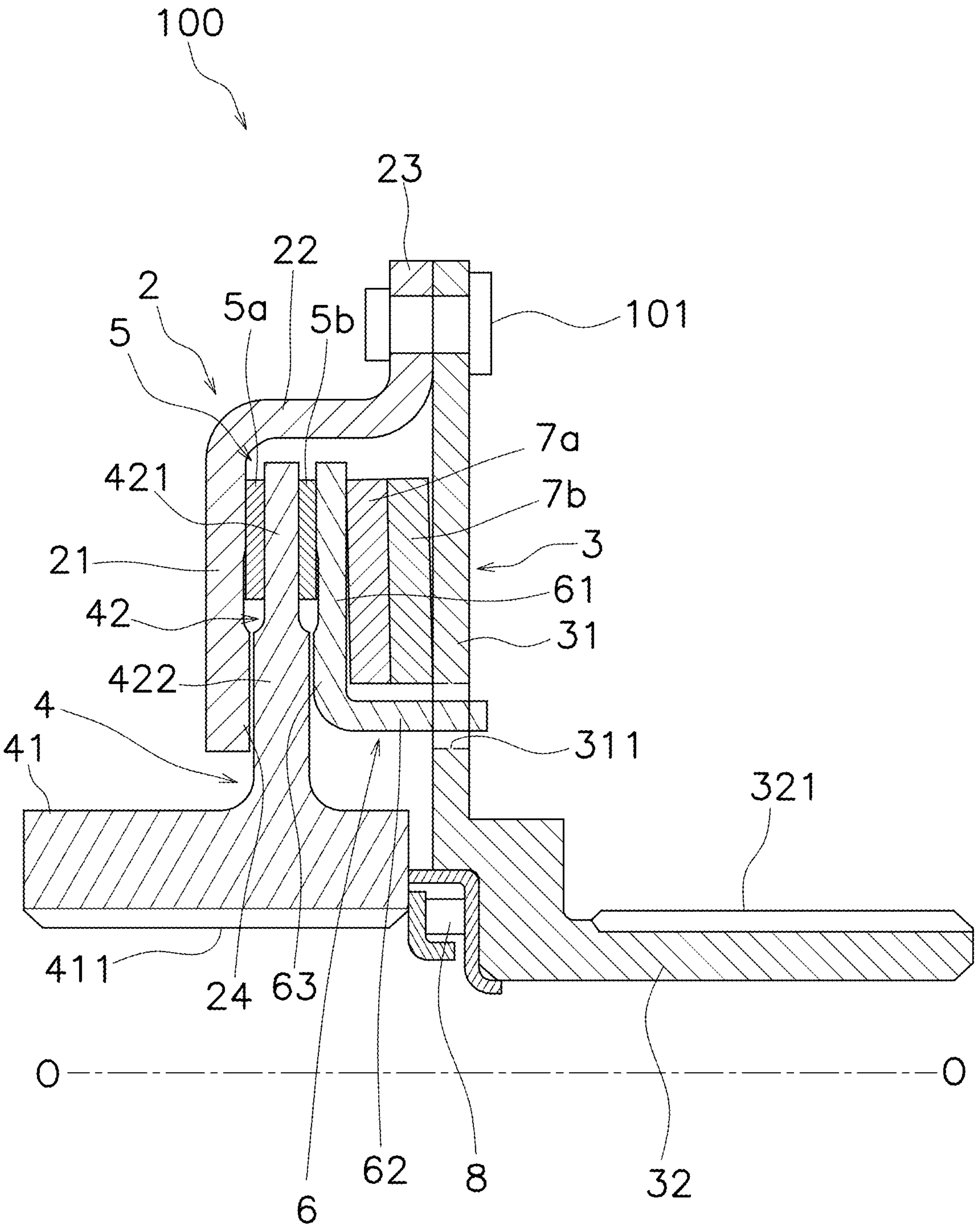
100
23
22
2
5a
5b
101
5
7a
421
7b
3
21
61
42
31
422
4
311
41
321
411
24
63
O
O
62
8
32
6

TORQUE LIMITER

CROSS-REFERENCE TO RELATED APPLICATIONS

This application is based on and claims the priority benefit of Japanese application 2023-126060 filed on Aug. 2, 2023, the contents of which are incorporated herein by reference.

TECHNICAL FIELD

The claimed invention relates to a torque limiter.

BACKGROUND

A torque limiter is used for blocking transmission of a torque with a magnitude of a predetermined value or greater. For example, Japan Laid-open Patent Application Publication No. 2023-011159 discloses a torque limiter disposed between a flywheel and a damper device. In the torque limiter, a pressing plate is pressed onto a lining plate by the urging force of a disc spring, whereby the pressing plate is engaged by friction with the lining plate. Because of this, it is made possible to block transmission of the torque with the magnitude of a predetermined value or greater.

Reduction in size of the torque limiter has been demanded in consideration of a place for installing the torque limiter. However, when the torque limiter is reduced in size, the disc spring is also reduced in diameter. This results in a drawback that the disc spring cannot apply a sufficient pressing load.

SUMMARY OF THE INVENTION

It is an object of the claimed invention to provide a torque limiter that facilitates size reduction.

A torque limiter according to a first aspect includes a first cover plate, a second cover plate, a transmission member, a pressure plate, a plurality of disc springs, and a friction-generating unit. The second cover plate is disposed away from the first cover plate at an interval in an axial direction. The transmission member is disposed between the first cover plate and the second cover plate. The pressure plate is disposed between the second cover plate and the transmission member. Each of the disc springs is disposed between the pressure plate and the second cover plate. The disc springs urge the pressure plate toward the transmission member. The disc springs are stacked in parallel. The friction-generating unit is disposed between the first cover plate and the transmission member and/or between the pressure plate and the transmission member.

According to the configuration, the plurality of disc springs are used while being stacked in parallel; hence, it is made possible to increase a pressing load applied by the disc springs. Therefore, the size of the torque limiter can be reduced without insufficiency of the pressing force to be applied by the disc springs.

A torque limiter according to a second aspect relates to the torque limiter according to the first aspect and is configured as follows. One of the disc springs is in contact at an outer peripheral end thereof with the pressure plate.

A torque limiter according to a third aspect relates to the torque limiter according to the first or second aspect and is configured as follows. One of the disc springs is in contact at an inner peripheral end thereof with the second cover plate.

A torque limiter according to a fourth aspect relates to the torque limiter according to any of the first to third aspects and further includes a thrust bearing. The thrust bearing is disposed between the transmission member and the second cover plate in the axial direction.

A torque limiter according to a fifth aspect relates to the torque limiter according to any of the first to fourth aspects and is configured as follows. The pressure plate includes a pressing portion and an extending portion. The pressing portion is disposed between the transmission member and the plurality of disc springs in the axial direction. The pressing portion is made in the shape of an annulus. The extending portion extends from an inner peripheral end of the pressing portion toward the second cover plate in the axial direction. The disc springs are disposed radially outside the extending portion.

A torque limiter according to a sixth aspect relates to the torque limiter according to any of the first to fifth aspects and is configured as follows. The friction-generating unit includes a first friction material and a second friction material. The first friction material is disposed between the first cover plate and the transmission member. The second friction material is disposed between the pressure plate and the transmission member.

A torque limiter according to a seventh aspect relates to the torque limiter according to the sixth aspect and is configured as follows. The transmission member includes a flanged portion. The flanged portion includes an outer peripheral part and an inner peripheral part. The outer peripheral part receives the first and second friction materials attached thereto. The inner peripheral part is larger in thickness than the outer peripheral part.

A torque limiter according to an eighth aspect relates to the torque limiter according to the seventh aspect and is configured as follows. The first cover plate includes a protruding portion. The protruding portion protrudes toward the inner peripheral part of the flanged portion.

A torque limiter according to a ninth aspect relates to the torque limiter according to the seventh or eighth aspect and is configured as follows. The pressure plate includes a protruding portion. The protruding portion protrudes toward the inner peripheral part of the flanged portion.

A torque limiter according to a tenth aspect relates to the torque limiter according to any of the first to ninth aspects and is configured as follows. The transmission member includes a cylindrical portion and a flanged portion. The flanged portion extends radially outward from the cylindrical portion. The cylindrical portion includes a spline hole extending in the axial direction.

A torque limiter according to an eleventh aspect relates to the torque limiter according to any of the first to tenth aspects and is configured as follows. The second cover plate includes a cover body and a cylindrical portion. The cover body is opposed to the plurality of disc springs in the axial direction. The cylindrical portion extends from an inner peripheral end of the cover body in the axial direction. The cylindrical portion includes a gear part on an outer peripheral surface thereof.

Overall, according to the claimed invention, reduction in size of a torque limiter is enabled.

BRIEF DESCRIPTION OF THE DRAWING

The FIGURE is a half-cross-sectional view of a torque limiter in accordance with the claimed invention (the torque limiter being axisymmetric about the rotational axis O-O).

DETAILED DESCRIPTION

A torque limiter 100 according to a present preferred embodiment will be hereinafter explained with reference to drawing. It should be noted that in the following explanation, the term "axial direction" refers to an extending direction of a rotational axis O of the torque limiter 100. On the other hand, the term "circumferential direction" refers to a circumferential direction of an imaginary circle about the rotational axis O, whereas the term "radial direction" refers to a radial direction of the imaginary circle about the rotational axis O.

As shown in the FIGURE, the torque limiter 100 is disposed to be rotatable about the rotational axis O. The torque limiter 100 is configured to block transmission of a torque with a magnitude of a predetermined value or greater. The torque limiter 100 includes a first cover plate 2, a second cover plate 3, a transmission member 4, a friction-generating unit 5, a pressure plate 6, a first disc spring 7*a*, a second disc spring 7*b*, and a thrust bearing 8. For example, the torque limiter 100 may be disposed inside a transmission. The torque limiter 100 is, for instance, a wet type. In the present preferred embodiment, the torque is inputted to the torque limiter 100 through the transmission member 4 and is outputted therefrom through the second cover plate 3.

<First Cover Plate>

The first cover plate 2 is disposed to be rotatable about the rotational axis O. The first cover plate 2 includes a first cover body 21, a first cylindrical portion 22, an attachment portion 23, and a first protruding portion 24.

The first cover body 21 is made in the shape of an annulus extending in the circumferential direction. The first cylindrical portion 22 extends from the outer peripheral end of the first cover body 21 in the axial direction. Specifically, the first cylindrical portion 22 extends from the first cover body 21 toward the second cover plate 3.

The attachment portion 23 extends radially outward from the distal end of the first cylindrical portion 22. The attachment portion 23 is made in the shape of an annulus extending in the circumferential direction. The first cover plate 2 is attached at the attachment portion 23 to the second cover plate 3.

The first protruding portion 24 protrudes from an inner peripheral part of the first cover body 21 toward the transmission member 4 in the axial direction. The first protruding portion 24 is made in the shape of an annulus extending in the circumferential direction. The first protruding portion 24 protrudes toward an inner peripheral part 422 of a flanged portion 42 to be described. The first protruding portion 24 is opposed to the inner peripheral part 422 in the axial direction. Besides, the first protruding portion 24 is opposed to the inner peripheral part 422, while being disposed away therefrom at an interval.

<Second Cover Plate>

The second cover plate 3 is disposed away from the first cover plate 2 at an interval in the axial direction. Specifically, the second cover plate 3 is disposed away from the first cover body 21 of the first cover plate 2 at an interval in the axial direction.

The second cover plate 3 is disposed to be rotatable about the rotational axis O. The second cover plate 3 is configured to be unitarily rotated with the first cover plate 2. The second cover plate 3 is fixed at the outer peripheral end thereof to the first cover plate 2. Specifically, the second cover plate 3 is fixed to the attachment portion 23 of the first cover plate 2. The second cover plate 3 is fixed to the first cover plate 2 by one or more rivets 101.

The second cover plate 3 includes a second cover body 31 and a second cylindrical portion 32. The second cover body 31 is made in the shape of an annulus extending in the circumferential direction. The second cover body 31 is disposed away from the first cover body 21 at an interval in the axial direction. Some of the members composing the torque limiter 100 are disposed between the first cover body 21 and the second cover body 31. The second cover body 31 is smaller in inner diameter than the first cover body 21. The second cover body 31 is opposed to the second disc spring 7*b* in the axial direction.

The second cylindrical portion 32 extends from the inner peripheral end of the second cover body 31 in the axial direction. Specifically, the second cylindrical portion 32 extends in a direction away from the first cover plate 2. The second cylindrical portion 32 includes a gear part 321 on the outer peripheral surface thereof. A gear (omitted in the illustration) meshes with the gear part 321. The torque limiter 100 outputs the torque through the gear part 321.

<Transmission Member>

The transmission member 4 is disposed to be rotatable about the rotational axis O. The transmission member 4 is disposed between the first cover plate 2 and the second cover plate 3 in the axial direction. The transmission member 4 includes a third cylindrical portion 41 and the flanged portion 42.

The third cylindrical portion 41 includes a spline hole 411. The spline hole 411 extends in the axial direction. A shaft (omitted in the illustration) is spline-coupled to the spline hole 411. Because of this, torque is transmitted from the shaft to the transmission member 4. In other words, the torque is inputted to the torque limiter 100 through the transmission member 4.

The third cylindrical portion 41 is larger in inner diameter than the second cylindrical portion 32. It should be noted that the third cylindrical portion 41 may be smaller in inner diameter than the second cylindrical portion 32. Besides, the third cylindrical portion 41 is larger in outer diameter than the second cylindrical portion 32. It should be noted that the third cylindrical portion 41 may be smaller in outer diameter than the second cylindrical portion 32.

The flanged portion 42 extends radially outward from the outer peripheral surface of the third cylindrical portion 41. The flanged portion 42 is disposed between the first cover plate 2 and the second cover plate 3 in the axial direction. Specifically, the flanged portion 42 is disposed between the first cover body 21 and the second cover body 31 in the axial direction. The third cylindrical portion 41 is disposed radially inside the first cover body 21.

The flanged portion 42 includes an outer peripheral part 421 and the inner peripheral part 422. The inner peripheral part 422 is larger in thickness than the outer peripheral part 421. Specifically, the inner peripheral part 422 protrudes to both axial sides with respect to the outer peripheral part 421.

The friction-generating unit 5 includes a first friction material 5*a* and a second friction material 5*b*. The first friction material 5*a* is disposed between the first cover plate 2 and the transmission member 4 in the axial direction. Specifically, the first friction material 5*a* is disposed between the first cover body 21 and the flanged portion 42. The first friction material 5*a* is fixed to the transmission member 4. Specifically, the first friction material 5*a* is fixed to the outer peripheral part 421 of the flanged portion 42 of the transmission member 4. The first friction material 5*a* is fixed to the outer peripheral part 421 by, for instance, an adhesive. The first friction material 5*a* is in contact with the first cover plate 2. Specifically, the first friction material 5*a* is in contact with the first cover body 21.

<Friction-Generating Unit>

The second friction material 5*b* is disposed between the transmission member 4 and the pressure plate 6 in the axial direction. Specifically, the second friction material 5*b* is disposed between the flanged portion 42 and a pressing portion 61 to be described. The second friction material 5*b* is fixed to the transmission member 4. Specifically, the second friction material 5*b* is fixed to the outer peripheral part 421 of the flanged portion 42 of the transmission member 4. The second friction material 5*b* is fixed to the outer peripheral part 421 by, for instance, an adhesive. The second friction material 5*b* is in contact with the pressure plate 6. Specifically, the second friction material 5*b* is in contact with the pressing portion 61 to be described.

<Pressure Plate>

The pressure plate 6 is disposed to be rotatable about the rotational axis O. The pressure plate 6 is disposed between the second cover plate 3 and the transmission member 4 in the axial direction. The pressure plate 6 includes the pressing portion 61, a plurality of extending portions 62, and a second protruding portion 63.

The pressing portion 61 is made in the shape of an annulus extending in the circumferential direction. The pressing portion 61 is disposed between the first disc spring 7*a* and the flanged portion 42 in the axial direction. The pressing portion 61 is opposed to the second friction material 5*b* in the axial direction. When seen in the axial direction, the pressing portion 61 overlaps with the first cover body 21, the first friction material 5*a*, the flanged portion 42, and the second friction material 5*b*.

The extending portions 62 extend from the inner peripheral end of the pressing portion 61 toward the second cover plate 3 in the axial direction. The extending portions 62 are disposed apart from each other at intervals in the circumferential direction. The extending portions 62 are inserted at the distal ends thereof into through holes 311 perforated in the second cover body 31 of the second cover plate 3. With this configuration, the pressure plate 6 is unitarily rotated with the second cover plate 3.

The second protruding portion 63 protrudes from an inner peripheral part of the pressing portion 61 toward the inner peripheral part 422 of the flanged portion 42 in the axial direction. The second protruding portion 63 is opposed to the inner peripheral part 422 in the axial direction. The second protruding portion 63 is disposed away from the inner peripheral part 422 at an interval. The second protruding portion 63 is made in the shape of an annulus extending in the circumferential direction. When seen in the axial direction, the second protruding portion 63 overlaps with the first protruding portion 24.

<First and Second Disc Springs>

The first and second disc springs 7*a* and 7*b* are disposed to be rotatable about the rotational axis O. The first and second disc springs 7*a* and 7*b* are stacked in parallel. In other words, the first and second disc springs 7*a* and 7*b* are overlapped to face in the same direction (in terms of concavity/convexity). The first and second disc springs 7*a* and 7*b* are disposed between the pressure plate 6 and the second cover plate 3 in the axial direction. Specifically, the first and second disc springs 7*a* and 7*b* are disposed between the pressing portion 61 and the second cover body 31 in the axial direction.

The first and second disc springs 7*a* and 7*b* are disposed radially outside the extending portions 62. The first and second disc springs 7*a* and 7*b* are disposed radially away from the extending portions 62 at an interval. Besides, the first and second disc springs 7*a* and 7*b* are disposed radially inside the first cylindrical portion 22. In other words, the first and second disc springs 7*a* and 7*b* are enclosed by the pressing portion 61, the extending portions 62, the first cylindrical portion 22, and the second cover body 31.

The first and second disc springs 7*a* and 7*b* urge the pressure plate 6 toward the transmission member 4 in the axial direction. As a result, the first cover plate 2 and the pressure plate 6 are engaged by friction with the transmission member 4 through the first and second friction materials 5*a* and 5*b*.

The first disc spring 7*a* is in contact with the pressure plate 6, whereas the second disc spring 7*b* is in contact with the second cover plate 3. The first disc spring 7*a* is in contact at the outer peripheral end thereof with the pressure plate 6. The second disc spring 7*b* is in contact at the inner peripheral end thereof with the second cover plate 3.

The first and second disc springs 7*a* and 7*b* are of an identical type. In other words, the first and second disc springs 7*a* and 7*b* are identical to each other in material, size, and characteristics. It should be noted that the first and second disc springs 7*a* and 7*b* may be different from each other in material, size, and characteristics.

<Thrust Bearing>

The thrust bearing 8 is disposed between the transmission member 4 and the second cover plate 3 in the axial direction. Specifically, the thrust bearing 8 is disposed between the second cylindrical portion 32 and the third cylindrical portion 41.

<Actions>

When a torque with a magnitude of less than a predetermined value is inputted to the torque limiter 100 configured as described above, the torque is sequentially transmitted to the transmission member 4, the first friction material 5*a*, the first cover plate 2, and the second cover plate 3 in this order. On the other hand, when a torque with a magnitude of the predetermined value or greater is inputted to the transmission member 4, the transmission member 4 and the first cover plate 2 are rotated relative to each other, whereby transmission of the torque is blocked.

[Modifications]

One preferred embodiment of the claimed invention has been explained above. However, the claimed invention is not limited to the above, and a variety of changes can be made without departing from the scope of the claimed invention. It should be noted that, in general, respective modifications to be described are applicable simultaneously.

(a) In the preferred embodiment described above, the torque limiter 100 includes two disc springs; however, the torque limiter 100 may include three or more disc springs.

(b) In the preferred embodiment described above, a torque is inputted to the torque limiter 100 through the transmission member 4 and is outputted therefrom through the second cover plate 3; however, the torque may be transmitted in a reverse path to the above. In other words, the torque may be inputted to the torque limiter 100 through the second cover plate 3 and may be outputted therefrom through the transmission member 4.

(c) In the preferred embodiment described above, the torque limiter 100 is disposed inside a transmission; however, the torque limiter 100 may not be disposed inside a transmission. Besides, in the preferred embodiment described above, the torque limiter 100 is of a wet type; alternatively, the torque limiter 100 may be of a dry type.

(d) The extending portions 62 of the pressure plate 6 and the first and second disc springs 7*a* and 7*b* may be engaged with each other. Specifically, either the extending portions 62 or the first and second disc springs 7*a* and 7*b* may be provided with recesses, whereas the other may be provided with protrusions; then, the recesses and the protrusions may be engaged with each other. Accordingly, the pressure plate 6 and the first and second disc springs 7*a* and 7*b* can be prevented from rotating relative to each other.

(e) In the preferred embodiment described above, the friction-generating unit 5 includes the first and second friction materials 5*a* and 5*b*; however, the friction-generating unit 5 is not limited to this configuration. For example, the friction-generating unit 5 may include the first friction material 5*a* or the second friction material 5*b* only. In other words, the friction-generating unit 5 may be disposed either between the first cover plate 2 and the transmission member 4 or between the pressure plate 6 and the transmission member 4.

Alternatively, the friction-generating unit 5 may not include the first and second friction materials 5*a* and 5*b*. In that case, the friction-generating unit 5 may be directly formed among the transmission member 4, the first cover plate 2, and the pressure plate 6. Specifically, the first cover plate 2 and the transmission member 4 may be engaged by friction in contact with each other to form the friction-generating unit 5. Besides, the pressure plate 6 and the transmission member 4 may be engaged by friction in contact with each other to form the friction-generating unit 5.

LIST OF REFERENCE NUMERALS

2: First cover plate, 24: First protruding portion, 3: Second cover plate, 32: Second cylindrical portion, 321: Gear part, 4: Transmission member, 41: Third cylindrical portion, 411: Spline hole, 42: Flanged portion, 421: Outer peripheral part, 422: Inner peripheral part, 5: Friction-generating unit, 5*a*: First friction material, 5*b*: Second friction material, 6: Pressure plate, 61: Pressing portion, 62: Extending portion, 63: Second protruding portion, 7*a*: First disc spring, 7*b*: Second disc spring, 8: Thrust bearing, 100: Torque limiter

The invention claimed is:

1. A torque limiter, comprising:

a first cover plate;

a second cover plate disposed away from the first cover plate at an interval in an axial direction;

a transmission member disposed between the first cover plate and the second cover plate and including a flanged portion;

a pressure plate disposed between the second cover plate and the transmission member the pressure plate having a pressing portion extending in a circumferential direction, an extending portion extending in an axial direction, and a protruding portion extending from an inner peripheral end of the pressing portion in an axial direction;

a plurality of disc springs disposed between the pressure plate and the second cover plate, the plurality of disc springs urging the pressure plate toward the transmission member, the plurality of disc springs stacked in parallel; and a friction-generating unit disposed between the first cover plate and the transmission member and/or between the pressure plate and the transmission member, the friction-generating unit including a first friction material and a second friction material, the first friction material being disposed between the first cover plate and the transmission member and the second friction material being disposed between the pressure plate and the transmission member, the flanged portion including an outer peripheral part and an inner peripheral part, the outer peripheral part receiving the first and second friction materials attached thereto and the inner peripheral part being larger in thickness than the outer peripheral part and protruding on both axial sides with respect to the outer peripheral part, a radially inner part of the inner peripheral part radially extending past an inner peripheral part of the protruding portion.

2. The torque limiter according to claim 1, wherein one of the plurality of disc springs is in contact at an outer peripheral end thereof with the pressure plate.

3. The torque limiter according to claim 1, wherein one of the plurality of disc springs is in contact at an inner peripheral end thereof with the second cover plate.

4. The torque limiter according to claim 1, further comprising a thrust bearing disposed between the transmission member and the second cover plate in the axial direction.

5. The torque limiter according to claim 1, wherein the pressing portion is made in the shape of an annulus, the pressing portion is disposed between the transmission member and the plurality of disc springs in the axial direction, and the extending portion extends from an inner peripheral end of the pressing portion toward the second cover plate in the axial direction, and the plurality of disc springs are disposed radially outside the extending portion.

6. The torque limiter according to claim 1, wherein the first cover plate includes a protruding portion protruding toward the inner peripheral part of the flanged portion.

7. The torque limiter according to claim 1, wherein the protruding portion protrudes toward the inner peripheral part of the flanged portion.

8. The torque limiter according to claim 1, wherein the transmission member includes a cylindrical portion and a flanged portion extending radially outward from the cylindrical portion, and the cylindrical portion includes a spline hole extending in the axial direction.

9. The torque limiter according to claim 1, wherein the second cover plate includes a cover body and a cylindrical portion, the cover body being opposed to the plurality of disc springs in the axial direction and the cylindrical portion extending from an inner peripheral end of the cover body in the axial direction, and the cylindrical portion includes a gear part on an outer peripheral surface thereof.

* * * * *